July 30, 1957 H. G. HOFFMEISTER 2,800,917
VALVE FOR POULTRY WATERING TROUGH
Filed March 16, 1953 6 Sheets—Sheet 1
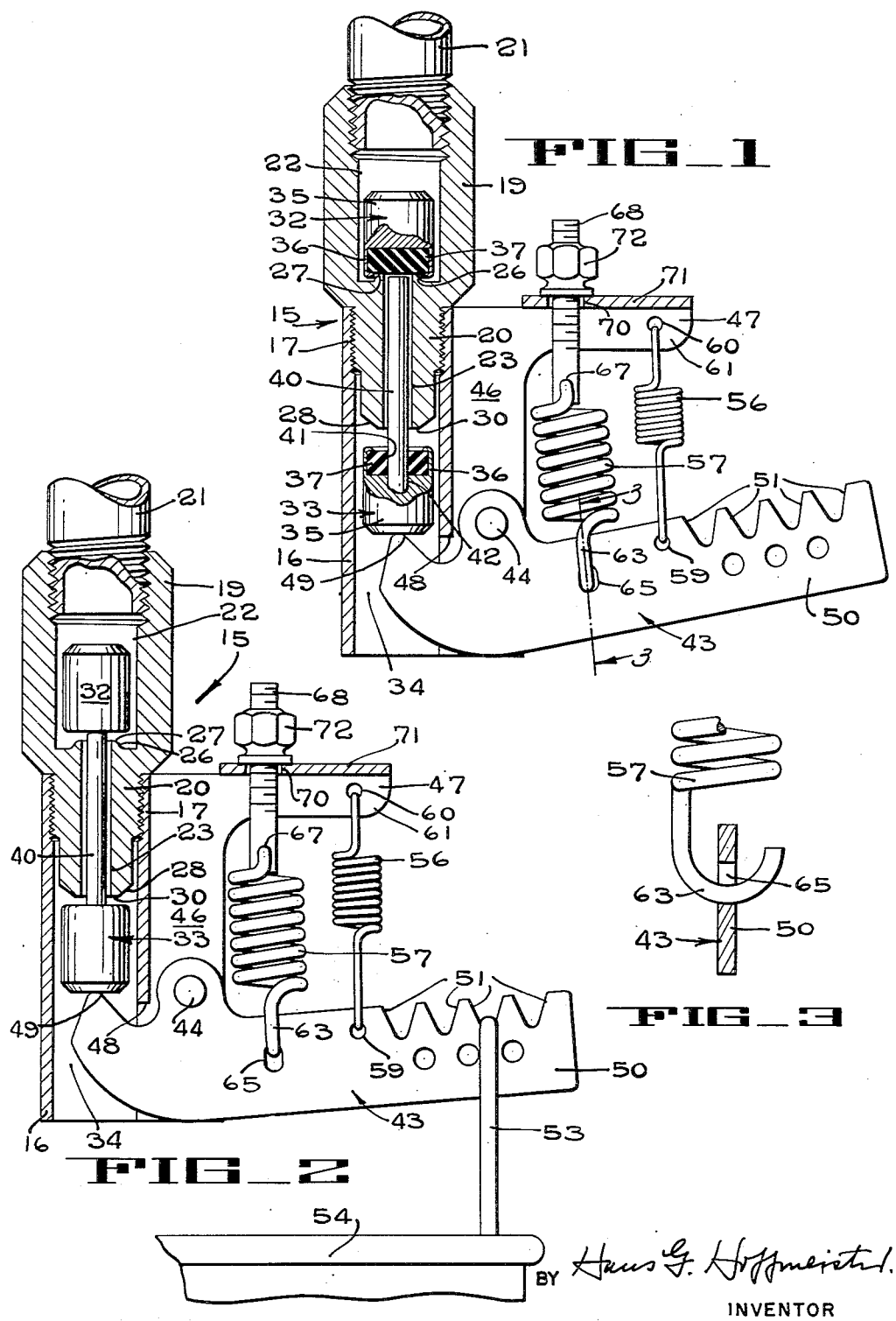
INVENTOR
BY Hans G. Hoffmeister

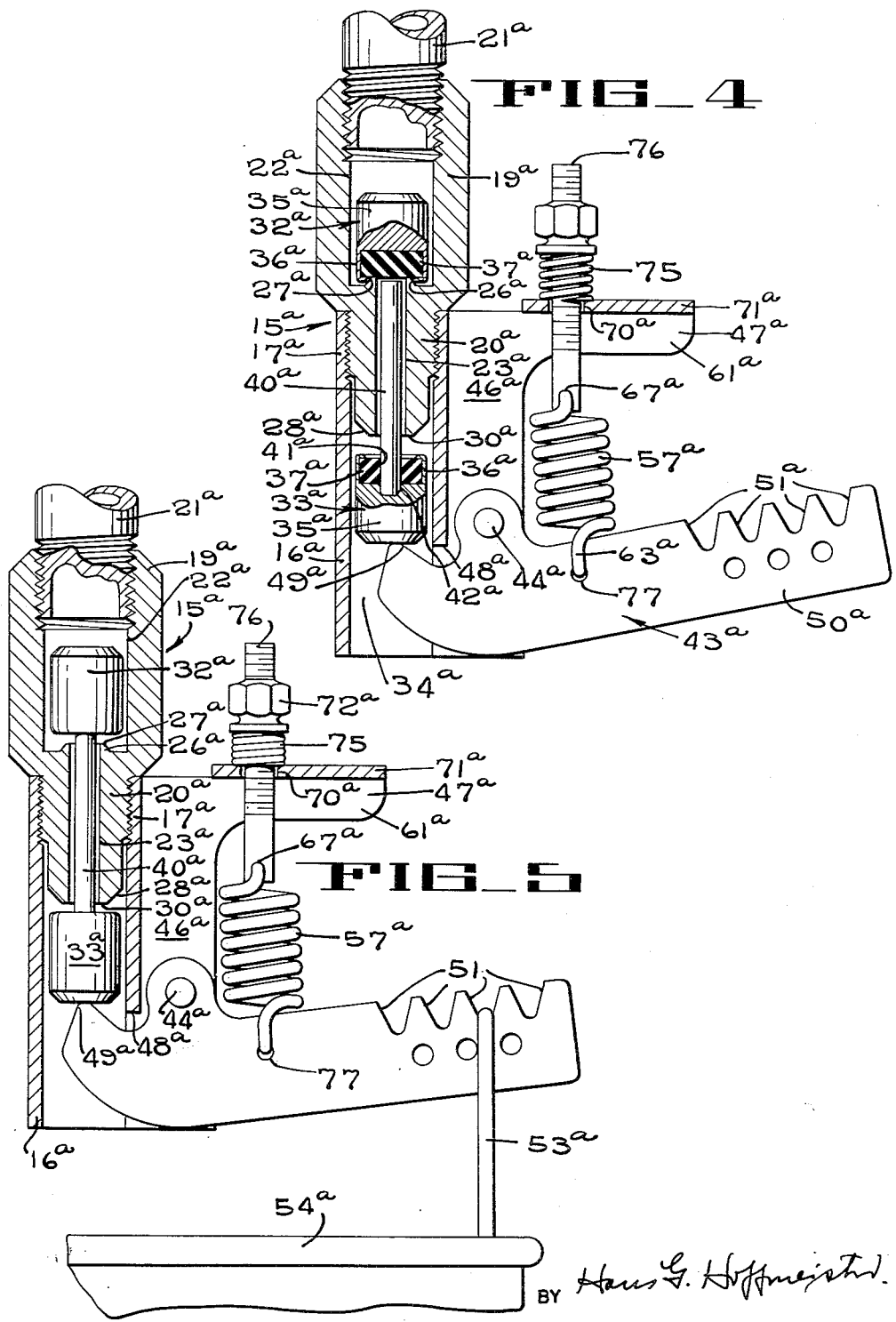

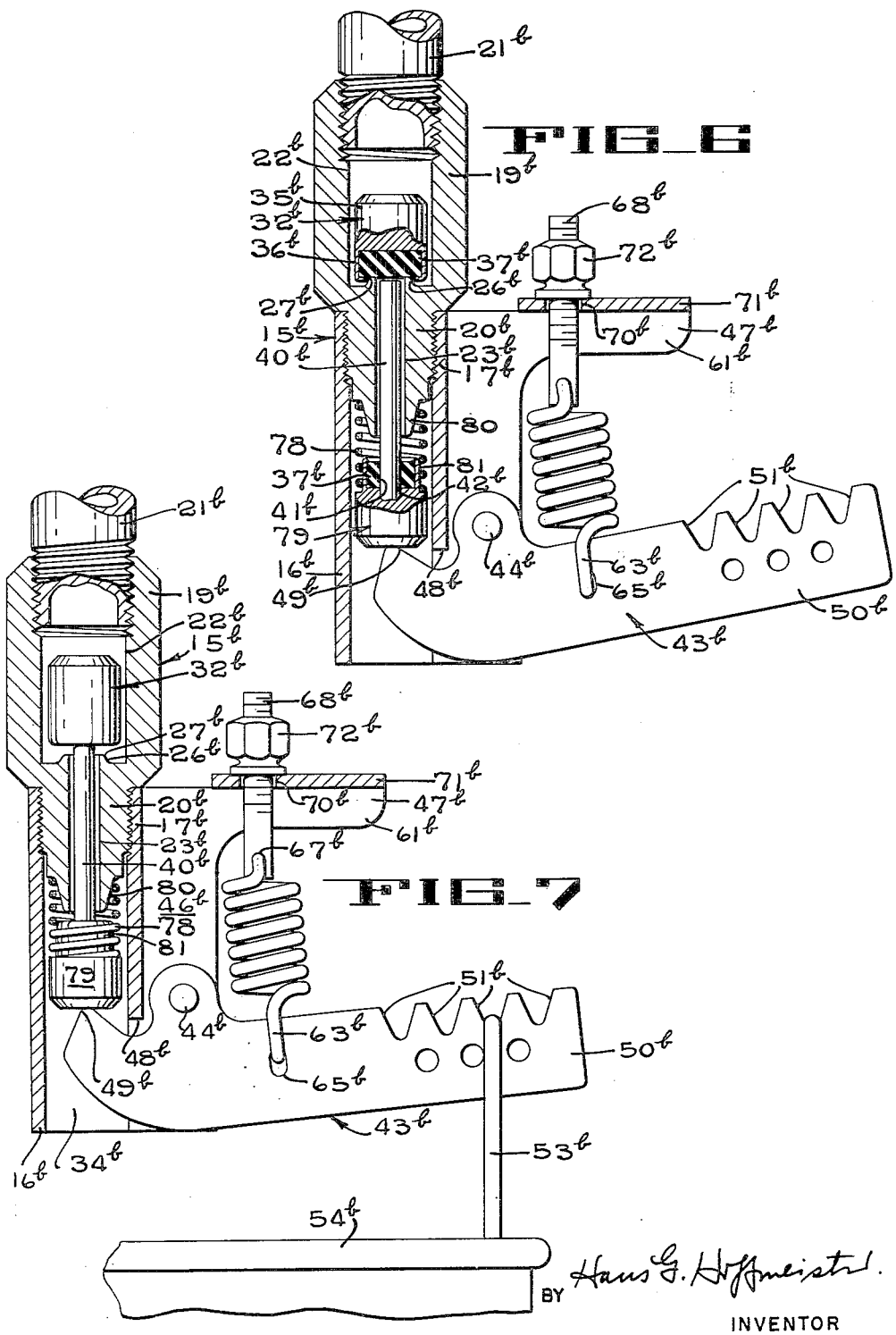

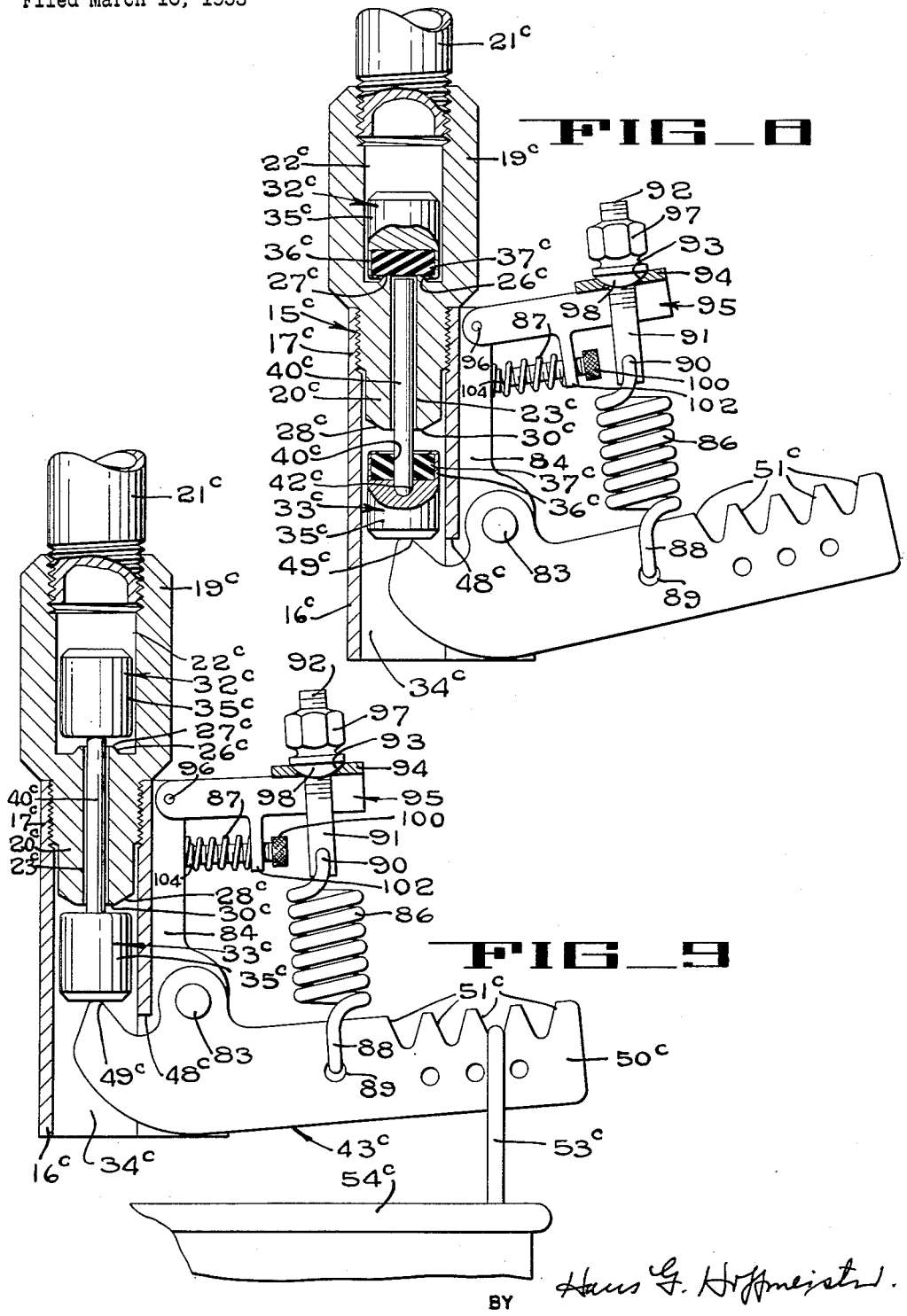

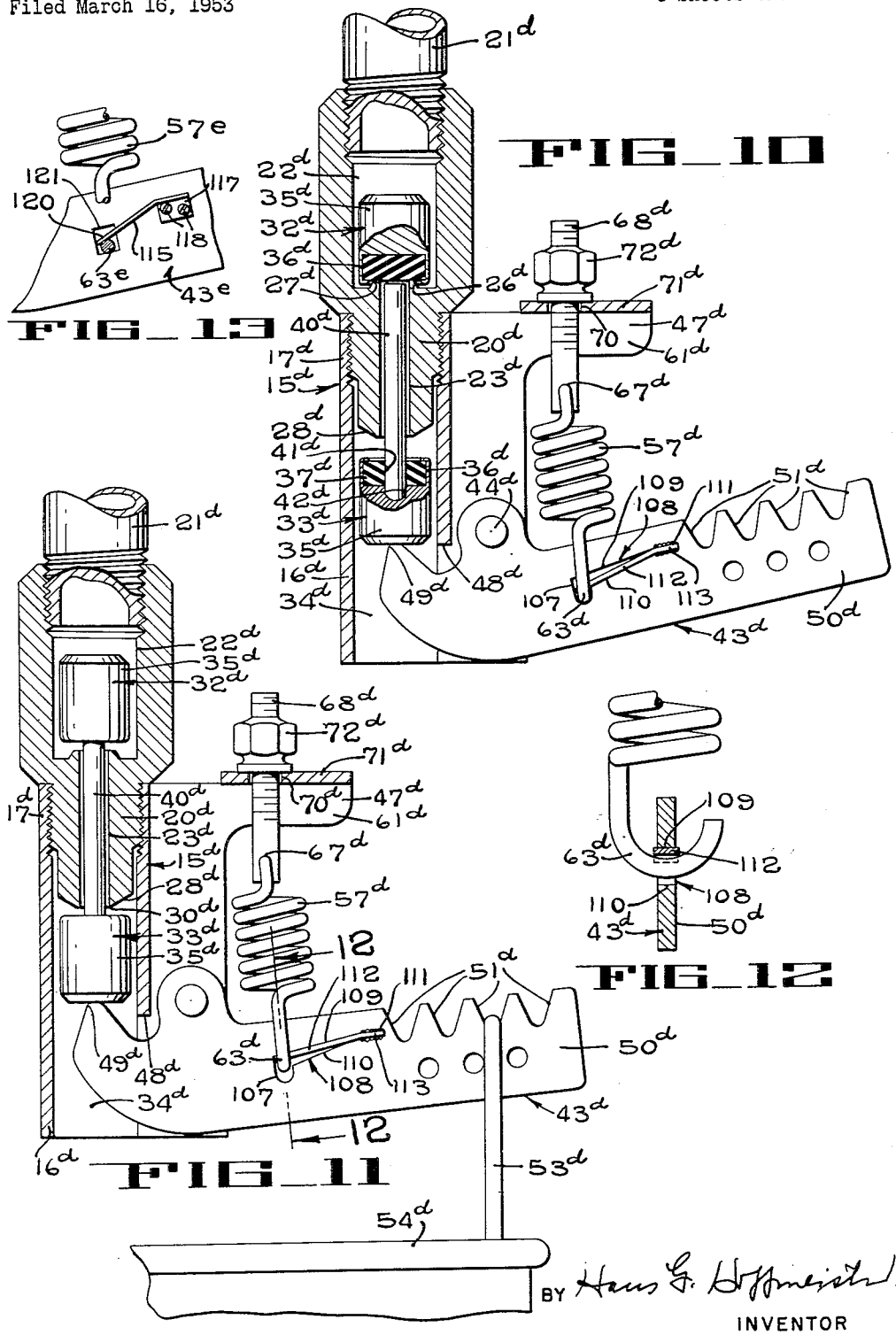

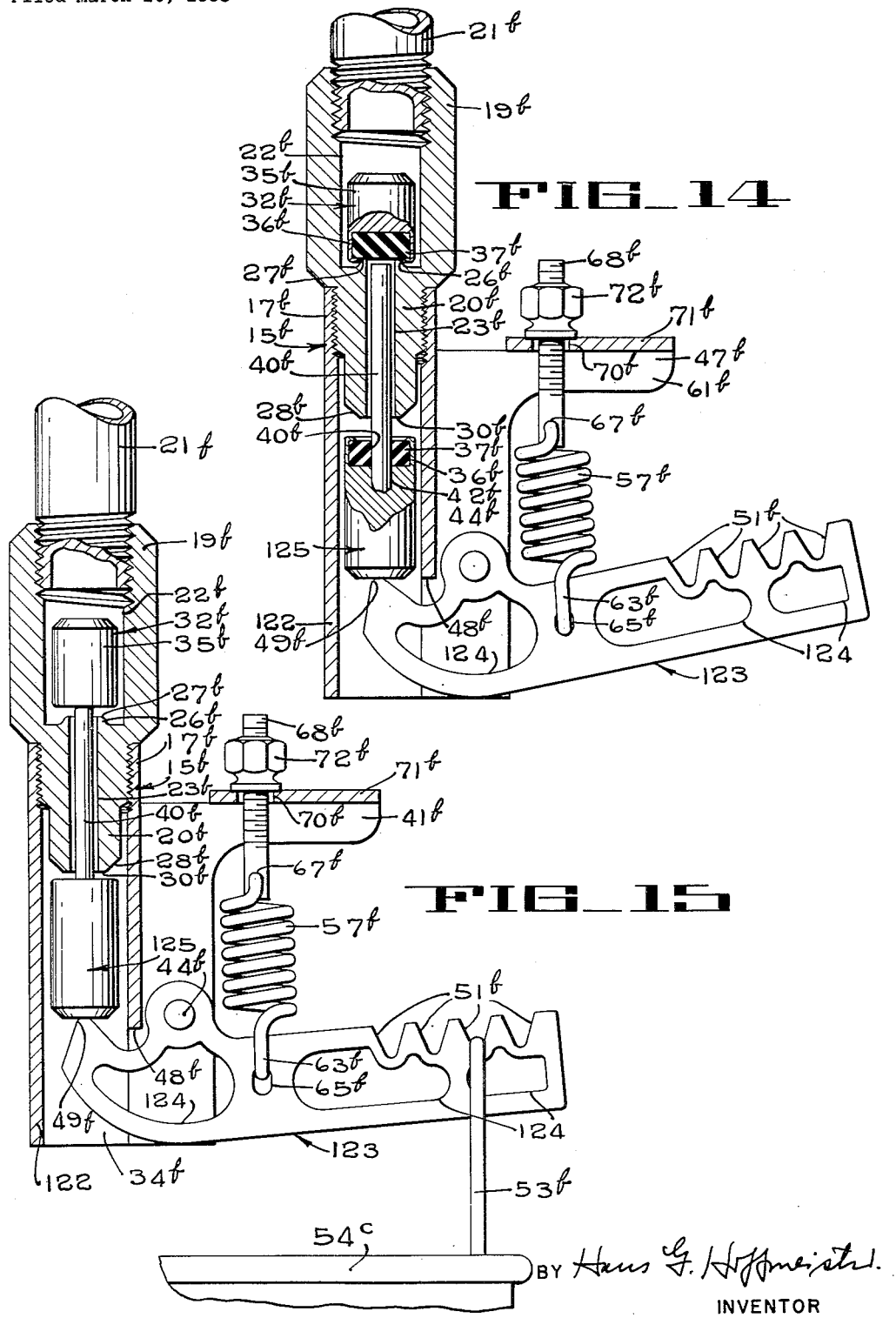

United States Patent Office 2,800,917
Patented July 30, 1957

2,800,917

VALVE FOR POULTRY WATERING TROUGH

Hans G. Hoffmeister, San Jose, Calif., assignor to Food Machinery and Chemical Corporation, San Jose, Calif., a corporation of Delaware Application March 16, 1953, Serial No. 342,351

19 Claims. (Cl. 137—408)

This invention appertains to valves for regulating liquid flow. More particularly it relates to a flow regulating valve of the type adapted for automatic operation to maintain a substantially uniform volume of water in a receptacle supported by the valve.

The automatic valve of the present invention is particularly adapted for use with a poultry watering trough or the like wherein one end of the trough is pivotally mounted on a suitable fixed support while the opposite end is freely suspended from an actuating lever of the valve so that the weight of the liquid in the trough automatically operates the valve and regulates the water level in the trough.

One type of valve used in such installations, hereinafter referred to as a double-acting valve, has an upper and a lower valve-controlled port. During normal trough-filling operation of such an automotive valve, an upper valve member is held off the upper port while a lower valve member is moved, by means of a suitable spring-loaded linkage, between open and closed positions as the weight of water in the trough varies. If the trough is removed, as for cleaning, the upper valve is closed by the pressure of the water. When the trough is to be replaced, both valves must be held in an open intermediate position, either manually or by a latch, until a sufficient weight of water is deposited in the trough to bring the valve operation under the control of the valve linkage.

It is an object of the present invention to provide an automatic valve for a poultry watering trough wherein the valve members are automatically moved from a fully closed position to the open intermediate position by the weight of the trough when it is suspended from the valve actuating linkage.

Another object is the provision of resilient means for positively withdrawing the valve actuating linkage from contact with the valve when the trough is removed for cleaning or the like whereby the pressure of the incoming water may close the upper valve.

Other and further objects and advantages of the present invention will become apparent from the following description and accompanying drawings, in which:

Fig. 1 is a vertical section taken centrally through a liquid flow control valve constructed in accordance with the teaching of the present invention.

Fig. 2 is a vertical section, similar to Fig. 1, showing the valve elements in a different operating position.

Fig. 3 is a vertical section taken on line 3—3 of Fig. 2.

Fig. 4 is a vertical section taken centrally through a first modification of the automatic flow valve of the present invention.

Fig. 5 is a central vertical section of the valve of Fig. 4 showing the valve elements in a different operating position.

Fig. 6 is a vertical section taken centrally through a second modification of the automatic flow valve of the present invention.

Fig. 7 is a central vertical section showing the elements of the valve of Fig. 6 in a different operating position.

Fig. 8 is a vertical section taken centrally through a third modification of the valve of the present invention.

Fig. 9 is a vertical section, similar to Fig. 8, but showing the valve elements in a different operating position.

Fig. 10 is a vertical section taken centrally through a fourth modification of the automatic valve of the present invention.

Fig. 11 is a vertical section similar to Fig. 10 but showing the elements in a different operating position.

Fig. 12 is a vertical section taken on line 12—12 of Fig. 11.

Fig. 13 is a fragmentary side elevation of a modified form of the spring control member of Fig. 10.

Fig. 14 is a vertical section taken centrally through a fifth modification of the automatic valve of the present invention.

Fig. 15 is a vertical section of the valve of Fig. 14 showing the elements in a different operating position.

In Figs. 1, 2 and 3 the reference numeral 15 indicates generally a two-piece valve housing comprising a lower tubular member 16 having an internally threaded upper end 17, and an upper body member 19 with an externally threaded, reduced diameter shank portion 20, threadedly secured in the end 17 of the lower member 16. The upper body member 19 has a hollow central portion defining a chamber 22 which communicates at its upper end with a water supply nipple 21 which is threaded therein and, at its lower end, with a bore 23 extending downwardly through the shank portion 20. A valve seat 27 is formed at the upper end of the bore 23 by the upper edge of an upstanding annular ridge 26 while, at the lower end of the bore, the bottom wall of the shank 20 is cut at an angle at 28 to form a lower valve seat 30. An upper, generally cylindrical, valve head 32 is disposed in the chamber 22 and a lower, generally cylindrical, valve head 33 is positioned in a chamber 34 defined by the inside of the lower tubular member 16. Both valve heads are smaller in cross-sectional area than are the chambers in which they are disposed so that liquid flow passages are defined around the valve heads. Each valve head has a brass body portion 35 with a projecting skirt or annular flange 36. The free end of the flange 36 is bent or peened over a resilient rubber disc 37 to retain the disc 37 and form a unitary valve head assembly. The rubber disc 37 of each valve head is adapted to be moved into contact with the associated valve seat 26 and 30, respectively, to close the port and stop the flow of water through the bore 23. A brass valve stem 40 is disposed in the bore 23 with the free upper end thereof disposed immediately adjacent the head 32. The lower end of the valve stem passes through a central opening 41 in the rubber disc 37 and into an opening 42 in the body portion 35 of the lower valve head 33 to be suitably secured therein, as by a threaded connection or a pressed fit. It is to be noted that the valve stem 40 is smaller in cross-section than the bore 23, so that a liquid passage is defined in the bore around the stem. Also, since the stem 40 is longer than the bore 23, one valve head will be held off its associated valve seat when the other valve head is against its seat. An intermediate position, wherein both valve heads are retained off their seats and the fluid flow passage through the bore 23 is open, is illustrated in Fig. 2.

The movement of the lower valve head 33 toward and away from the valve seat 30 is controlled by a valve actuating lever 43 which is pivotally mounted by means of a pin or rivet 44 to a flange 46 of a bracket 47 that is secured to or integrally formed with the tubular member 16 to project substantially radially outwardly therefrom. One arm of the actuating lever 43 extends through a slot 48 in the lower end of the tubular member 16 and has a rounded, inner end portion 49 arranged to abut the underside of the lower valve head 33 to retain it in position in the valve assembly. The other arm of the actuating lever 43 is provided with an end 50 having a series of notches 51, one of which, as seen in Fig. 2, receives a bail or supporting wire 53 attached near one end of a typical poultry watering trough 54. It will be understood, of course, that th other end of the trough is pivotally mounted on a suit-support in any well-known manner.

Clockwise pivotal movement of the actuating lever 43 is resisted by two springs 56 and 57. The spring 56 is a relatively light, coil type, tension spring having one end in hooked engagement in a small opening 59 in the lever 43 and the other hooked end engaged in an opening 60 in an arm 61 of the bracket 47. The spring 57 is a relatively heavy, coil-type, tension spring having a lower hooked end 63 disposed in an elongated slot 65 in the lever 43. The upper hooked end of the spring 57 is engaged in an opening 67 in the lower end of a threaded pin 68. The pin 68 extends upwardly through an opening 70 in a flange 71 projecting outwardly from the arm 61. A nut 72, threadedly engaged on the pin 68, bears against the upper surface of the flange 71 to resist downward movement movement of the spring 57.

In Fig. 1 the valve is illustrated in the position it assumes when the trough 54 has been removed for cleaning. It is to be noted that the valve stem 40 has moved away from the underside of the upper valve head 32 permitting the pressure of the incoming water to seat the valve head 32. The small spring 56 has pivoted the lever 43 about the pin 44 in a counterclockwise direction permitting the valve head 33 to move to a lower position, and the hooked end 63 of the large spring 57 has assumed a position at at lower end of the vertically elongated slot 65. It is a feature of the present invention that, when the empty trough 54 is again suspended from the lever 43, the valve will be moved to the open, intermediate position as indicated in Fig. 3. The clockwise movement of the lever 43 toward this open position is resisted by the small spring 56 and by the resistance of the water pressure on the valve head 32 and the weight of the valve heads 33 and 32 and the valve stem 40. It is to be particularly noted that the hooked end 63 of the large spring 57 is, in Fig. 2, disposed in the upper end of the elongated slot 65. Since the adjusting screw 72 is abutting the flange 71, further clockwise pivoting of the lever 43, as water is deposited in the trough 54, will be resisted by the extension of the large spring 57. When the lower valve head 33 has been moved upwardly by the lever 43 and seated after a predetermined quantity of water is in the trough, the large spring 57 and the small spring 56 are in an extended position. Then, when water is taken out of the trough or evaporates therefrom, the springs will pivot the lever 43 in a counterclockwise direction to move the valve toward the open position of Fig. 2 to replenish the supply of water in the trough.

The quantity of water that is deposited in the trough 54 before the valve 33 is closed may be increased by moving the bail 53 into one of the notches 51, in the lever bar 43, that is nearer to the pivot point 44.

It will be recognized therefore that an efficient automatic flow control valve is provided in this invention. The novel use of two springs, one to positively retract the valve actuating lever to permit the valve to be moved to closed position when the trough is removed and the other to yieldingly resist the movement of the valve to closed position as water is deposited in the trough, provides an arrangement wherein manual opening of the valve is completely eliminated. This valve is completely automatic in operation from the time the trough is suspended from the valve actuating linkage to the time that it is removed.

In Fig. 4 and 5 a modified form of the automatic flow control valve of the present invention is shown. This form is exactly the same as that shown in Fig. 1 with the exception that the small tension spring 56 of Fig. 1 is replaced by a compression spring 75 in Fig. 4, the threaded pin 68, Fig. 1, is replaced by a similar, but longer threaded pin 76 in Fig. 4, and the elongated slot 65 of Fig. 2 is replaced by a circular hole 77 in Fig. 4. All parts in the modification of Fig. 4 that are identical to parts in the valve of Fig. 1 will be given identical reference numerals followed by the suffix "a."

The compression spring 75 is disposed around the threaded pin 76 between the top surface of the flange 71a and the lower surface of the nut 72a. In Fig. 4 the valve is illustrated in closed position with the trough removed from the actuating lever 43a, and it is to be noted that the compression spring 75 and the heavy coil spring 57a are both in an expanded position. When the trough is again hung on the lever 43a, the light spring 75 is compressed while the heavy spring 57a acts as a rigid link transmitting the movement of the lever 43a to the spring 75. When the valve reaches the intermediate open position of Fig. 5, the spring 75 reaches a fully compressed position and, thereafter, the downward movement of the lever 43a, as water enters the trough 54a, is resisted solely by the expansion of the tension spring 57a. When the lower valve head 33a has been seated after a predetermined quantity of water is in the trough, the large spring 57a is in an extended condition and the small spring 75 is in a compressed condition. If water is removed from the trough, the large spring returns the valve to the open position of Fig. 5. If the trough is taken off the lever 43a, the compression spring 75 pivots the arm counterclockwise and the upper valve closes, while the large opening 57a acts as a rigid link.

In Figs. 6 and 7 a further modified form of the water valve of the present invention is shown. Again, all elements of the valve of Fig. 6 are identical to the elements of Fig. 1 with the exception that the small tension spring 56 of Fig. 1 has been replaced by a small compression spring 78 and the lower end of the shank 20 of the body member 19 has a reduced diameter tapered end portion 80, and th valve head 33 of Fig. 1 has been replaced by a valve head 79 that has a reduced diameter upper portion 81. The coil spring 78 is disposed over both reduced diameter portions 80 and 81 in abutting contact with the opposed shoulders formed by th reduced portions. All the parts in the modificaiton of Fig. 6 that are identical to the parts in the valve of Fig. 1 will be given identical reference numerals followed by a suffix "b."

With the trough removed from the valve linkage as shown in Fig. 6, it will be noted that the expanded compression spring 78 has moved the lower valve head 79 and the attached valve stem 40b downwardly permitting the incoming water to seat the upper valve head 32b, and causing counterclockwise pivoting of the lever 43b. When the trough is replaced on the arm 43b, the compression spring 78 resists the clockwise pivoting of the lever 43b due to the weight of the empty trough until the intermediate, open position of Fig. 7 is reached. Thereafter, both the compression spring 78 and the tension spring 57b control the movement of the lever 43b as water is directed into or taken from the trough.

In Figs. 8 and 9 another slightly modified form of the present invention is disclosed. In this form, parts identical to those in Fig. 1 will be indicated by identical numerals followed by the suffix "c." In this modified valve a lever 43c is pivoted at 83 on a flange 84 extending laterally from a lower housing 16c. Clockwise pivoting movement of the lever 43c is resisted by a large tension spring 86 and a small compression spring 87. The spring 86 has a hooked lower end 88 disposed in an opening 89 in lever 43c and an upper hooked end 90 disposed in an opening 91 in a threaded rod 92. The rod 92 extends through an opening 93 on a ledge 94 projecting from an arm 95 that is pivotally mounted at 96 on the flange 84. A nut 97 is threaded on the rod 91, pressing a washer 98 with a segmental spherical lower surface against a mating seat in the opening 93. The small compression spring 87 is disposed around an adjusting screw 100 that is threaded in a tapped opening in a tab 102 projecting downwardly from the arm 95. At one end, the spring 87 is bottomed against the end face of the flange 84 around a centering member 104 secured to the face and, at the other, the spring is bottomed against the tab 102.

When the trough is removed from the lever 43c, the compression spring 87, acting through the tab 102 of the arm 95, the rod 91, and the spring 86, pivots the lever 43c in a counterclockwise direction permitting the lower valve head 33c and the valve stem 40c to drop clear of the upper valve head 32c. The pressure of the incoming water then moves the valve head 32c into sealing engagement on the seat 27c. When the trough is again suspended from the lever 43c, the spring 87 is compressed, permitting the valve to move to the intermediate open position of Fig. 9. As this position is reached, the threaded end of the adjusting screw 100 moves into abutting contact with the centering member 104, thus stopping the pivoting movement of the arm 95. Thereafter, counterclockwise movement of the valve actuating lever 43c is resisted solely by the elongation of the tension spring 86.

In Figs. 10, 11 and 12 a further modified form of the automatic valve of the present invention is illustrated. This form of the valve is identical in most parts to that shown in Fig. 1 and the identical parts are indicated by the same numerals followed by the suffix "d." This modification differs from that of Fig. 1 in that the elongated hole 65 in the lever 43 of Fig. 1 is replaced by an opening formed by a vertical aperture 107 and an elongated horizontally extending slot 108. The slot 108 has upper and lower walls 109 and 110, respectively, which converge to form a narrow socket 111. A flat leaf spring 112 is disposed in the slot 108 having one end 113 welded in the socket 111 and the other free end in abutting contact with the hooked end 63d of the spring 57d, as seen in Fig. 12. The normal unflexed position of the leaf spring 112 is illustrated in Fig. 10. It is to be noted that in this unflexed position, the spring 112 is bent downwardly to follow the lower sloped wall 110 of the slot 108. When the trough is hung on the lever 43d, the lever 43d pivots clockwise so that the hooked end 63d of the spring 57d is moved to the upper end of the aperture 107 with the free end of the spring 112, in flexed position, between the hooked end 63d of the spring 57d and the upper wall 109 of the opening 108, as shown in Fig. 11. Thereafter, the flexing or expansion of the tension spring 57d controls the pivoting movement of the lever 43d as water is put into or taken from the trough.

In Fig. 13 another form of the leaf spring 112 of Fig. 10 is shown. This modification comprises a spring 115, which is normally disposed in the illustrated bent, unflexed position. This spring is secured by an integrally formed tab 117 to a lever 43e by screws 118. In this arrangement the leaf spring 115, instead of being disposed in a slot in the lever 43e, lies close alongside the lever 43e and has the free end 120 in abutting contact with the hooked end 63e of the spring 57e which extends through an opening 121 in the lever 43e. In operation, the spring 115 resists the pivoting movement of the lever 43e until the hooked end 63e engages the upper end of the opening 121.

In Figs. 14 and 15 another embodiment of the valve of the present invention is disclosed. This form of the valve is identical in most parts to that shown in Fig. 1 and identical parts are identified by identical reference numerals followed by the suffix "f." This form of the valve differs from Fig. 1 in that the tension spring 56 of Fig. 1 is completely eliminated, the lower housing member 16 is replaced by a longer member 122, and a valve actuating lever 123 is provided that has a plurality of cutout portions 124 to reduce its weight. The lower valve head 125 of Fig. 14 is considerably longer than the lower valve head 33 of Fig. 1 and therefore has greater weight. The weight of this head 125 is such that, when the trough is removed from the lever 123, it will cause the attached valve stem 40f to drop clear of the upper valve head 32f and pivot the arm 123 in a counterclockwise direction. It is evident that the head 125 may be made partially of lead or any similar relatively heavy material, if desired, to increase its weight.

When the trough is replaced on the lever 123, the lever 123 will be pivoted clockwise a predetermined distance, against the weight of the valve head 125, until the hooked end 63f of the tension spring 57f reaches the upper end of the slot 65f, which will coincide with the arrival of the valve heads 32f and 125 in the open, intermediate position of Fig. 15. Further pivoting movement of the lever 123, as water flows into the trough, is resisted by the weight of the valve head 125 and by extension of the spring 57f.

From the foregoing description of the several forms of the automatic liquid flow control valve of the present invention, it will now be apparent that in each form, a means is provided for positively retracting the pivotable actuating lever and the valve push rod from supporting contact with the top valve element in the valve assembly so that, as soon as the trough is lifted off the actuating lever, the top valve element can move into sealing engagement with its associated valve seat under the influence of gravity and the pressure of the incoming liquid. This positive withdrawal of the valve actuating mechanism assures quick and tight engagement of the valve with its seat and prevents leaking of the valve which would occur if the mechanism maintained a pressure against the bottom of the valve.

In Figs. 1, 6, 10, 13 and 14 the elongated slot in the valve actuating lever cooperates with the lower end of the main coil spring to provide a lost motion connection whereby the valve actuating lever can pivot through a first angular range of movement before the coil spring is actively engaged and is extended to resist the downward movement of the free end of the lever.

It will further be noted that in each form of the valve, the open position of the valve is positively defined by the engagement of an abutment suface, movable with the actuating lever, with an abutment surface associated with the stationary housing. In Figs. 1, 6, 10, 13, and 14 the abutment of the hooked end of the springs 57, 57b, 57d, 57e, and 57f respectively with the top wall of the slot in the actuating lever determines valve open position. In Fig. 4, the engagement of the fully compressed spring 75 with the top surface of the ledge 71a determines valve open position, and, in Fig. 8, the engagement of the end of the adjusting screw 100 with the abutment member 104 determines valve open position. Thus, the time when the water-level control valve begins operation is clearly defined in each valve assembly.

Having thus described my invention, what I claim as new and desire to protect by Letters Patent is:

1. A liquid-flow control valve comprising a housing having a liquid-flow passage therethrough, means defining a valve seat at each end of said flow passage, a valve having a first seating portion arranged to be moved by gravity into seating engagement with one of said seats and a second seating portion arranged to be moved alternately with said first seating valve into engagement with the other of said valve seats to stop the flow of liquid through said passage, said valve being arranged to be moved to an intermediate position with both seating portions off the seats, a pivotally mounted valve actuating member having a portion engageable with said valve to consecutively lift said first seating portion off its seat, move said valve to intermediate position, and move said second seating portion onto said seat when a downwardly directed force is applied to said member to move the member in one pivoting direction, a spring connected between said housing and said valve actuating member and disposed to normally bias said member in a direction to resist the movement of said valve to said intermediate position, said spring having a biasing force proportioned to stop the valve in said intermediate position when a downwardly directed force of predetermined value is applied to said actuating member.

2. A liquid-flow control valve comprising a housing having a liquid flow passage therethrough, means defining a valve seat at each end of said passage, a valve having a first and a second seating member, one member being associated with each valve seat for controlling flow of liquid through said passage, said valve being mounted for upward movement to consecutively unseat the first seating member, assume an intermediate position with both members removed from their seats, and then seat the second member, a valve actuating linkage having a portion engageable with said valve to move said valve upwardly when a downwardly directed force is applied to said linkage to move said linkage in one direction, and a spring system connected between said linkage and said housing and disposed to bias said linkage in a direction to resist movement of said linkage in said one direction when a predetermined downwardly directed force is applied to the linkage, said spring system and said housing having abutment surfaces automatically movable into engagement to arrest the movement when the valve reaches said intermediate position, said spring system having a biasing force proportioned to yieldingly resist further upward movement of said valve toward seating of said second seating member when an additional downwardly directed force is applied to the linkage.

3. A liquid flow control valve comprising a housing having a liquid flow passage therethrough, means defining a valve seat at each end of said passage, a valve having a first seating member normally disposed on one of said valve seats due to the force of gravity and a second seating member movable into seating engagement with the other of said valve seats, said valve being arranged to be moved upward to consecutively lift said first seating member from its seat, assume an intermediate position with both seating members removed from their respective seats, and then seat the escond seating member, a valve actuating linkage having a portion engageable with said valve to move said valve in said upward direction when a force is applied to said linkage tending to move said linkage portion in one direction, and a spring system connected between said housing and said linkage and disposed to bias said linkage in a direction to resist movement of said linkage in said one direction when a predetermined force is applied to the linkage, said system having a biasing force proportioned to arrest the movement of said linkage when said valve is in said intermediate position and to permit additional movement of said valve in said one direction to seat said second seating member when an additional force is applied to the linkage.

4. A liquid flow control valve comprising a housing having a liquid flow passage therethrough, means defining a valve seat at each end of said passage, a valve having a first seating member normally disposed on one of said valve seats due to the force of gravity and a second seating member movable into seating engagement with the other of said valve seats, said valve being arranged to be moved upwardly to constructively lift said first seating member from its seat, assume an intermediate position with both seating members removed from their respective seats, and then seat the second seating member, a valve actuating lever having a portion engageable with said valve to move said valve upwardly when a downwardly directed force is applied to said lever to move the lever in one direction control means operatively connected to said lever to bias said lever in a direction opposite to said one direction when a predetermined downwardly directed force is applied to said lever, and an exterior coil spring connected between said housing and lever and positioned to resist movement of said lever in said one direction, said coil spring having an initial tension and being so positioned relative to the pivot axis of said lever as to exert a turning moment on said lever opposite to and at least equal to the turning moment caused by said predetermined downwardly directed force whereby said coil spring is extended only after said valve reaches said intermediate position.

5. A liquid flow control valve comprising a housing having a liquid flow passage therethrough, means defining a valve seat at each end of said passage, a valve having a first and a second seating member, one member being associated with each valve seat for controlling flow of liquid through said passage, said valve being mounted for movement in one direction to consecutively unseat the first seating member, assume an intermediate position with both members removed from their seats, and then seat the second member, a valve actuating linkage arranged to move said valve in said one direction when a force is applied to said linkage, a first spring member disposed between said housing and said linkage and arranged to resist movement of said valve in said one direction when a predetermined force is applied thereto, and a second spring member disposed between said housing and said linkage and having a lost motion connection therebetween arranged to operatively connect said second spring member to said linkage for resisting further movement of said linkage only after said valve reaches said intermediate position.

6. A liquid flow control valve comprising a housing having a liquid flow passage therethrough, means defining a valve seat at each end of said passage, a valve having a first and a second seating member, one member being associated with each valve seat for controlling flow of liquid through said passage, said valve being mounted for movement in one direction to consecutively unseat the first seating member, assume an intermediate position with both members removed from their seats, and then seat the second member, a valve actuating linkage having a portion engageable with said valve to move said valve in said one direction when a predetermined force is applied to said linkage, a first spring connected between said housing and said linkage and arranged for flexing movement to yieldingly bias said linkage in a direction to resist the movement of said linkage as said valve is urged in said one direction, said first spring having a biasing force proportioned so that the movement of said linkage under said predetermined force is arrested when said valve reaches said intermediate position, a second spring disposed in the connection of said first spring between said housing and said linkage, said second spring having a biasing force proportioned to prevent flexing under the pull of said predetermined force whereby said second spring acts as a rigid link until the flexing movement of said first spring under said predetermined force is arrested and thereafter yieldingly resists the further movement of said valve in said one direction when additional force is applied to said linkage.

7. A liquid flow control valve comprising a valve housing having a liquid flow passage, a valve associated with said passage for controlling flow of liquid therethrough, a lever pivotally mounted on said housing and extending into said housing into operative engagement with said valve, said valve and said lever being so arranged that pivotal movement of said lever in one direction through a first angular range causes movement of said valve from closed to open position and continued pivotal movement of said lever in the same direction through a second angular range causes movement of said valve from open to closed position, means defining a first abutment surface associated with said lever for movement therewith, and means providing a second abutment surface carried by said housing, said abutment surfaces being positioned to automatically move into engagement with each other as said pivoting lever approaches the end of said first angular range of pivoting movement.

8. A liquid flow control valve comprising a valve housing having an upper inlet opening and a lower outlet opening with a liquid flow passage therebetween, means defining a valve seat at each end of said flow passage, a first valve element in said housing in the path of flow of incoming liquid and arranged to be moved into sealing engagement with the seat at the inlet end of said passage by the pressure of incoming liquid, a second valve element in said housing below the outlet end of said passage and disposed for upward movement into sealing engagement with the valve seat at said outlet end, a rod secured to said second valve element and extending upwardly therefrom and freely through said passage, said rod being longer than said passage whereby movement of one valve element onto its seat moves the other valve element away from its seat, a lever pivotally mounted on said housing having a first arm extending into said housing and into supporting contact under said second valve element, pivotal movement of said lever in a first direction through a first angular range being effective to move said second valve element upwardly to raise said first element off its seat and permit liquid flow through said passage, further angular displacement of said lever in said first direction through a second angular range being effective to move said second valve element into sealing engagement with its associated seat, said lever having a second arm extending exteriorly of said housing adapted to removably mount a receptacle in such a manner that mounting of the receptacle thereon effects pivoting of said lever in said one direction through said first angular range, a compression spring operatively associated with said lever for applying a turning moment to said lever opposing the pivoting of said lever through said first angular range, a ledge projecting from said housing above said second lever arm, a tension spring connected between said ledge and said second lever arm constructed and arranged to permit pivoting of said lever arm through said first angular range without tensioning said spring and to resist pivoting of said lever through said second angular range.

9. A liquid flow control valve comprising a valve housing having inlet and outlet openings with a liquid flow passage connecting said openings, a valve associated with said passage for opening and closing the same to control the flow of liquid therethrough, a lever pivotally mounted on said housing and having an arm extending into said housing into operative engagement with said valve, said lever arm and said valve being so arranged that pivoting of said lever in a first direction moves said valve successively from closed to open to closed positions relative to said passage, a first spring operatively connected between said lever and said housing and arranged to yieldingly resist the pivoting movement of said lever in said first direction as said valve is moved toward open position, and a second spring operatively connected between said lever and said housing and arranged to be stressed only after said valve has reached open position and to thereafter yieldingly resist further pivoting movement of said lever in said first direction as said valve is moved toward closed position.

10. A liquid flow control valve comprising a valve housing having an inlet and an outlet opening and a liquid flow passage connecting the openings, a valve associated with said passage for controlling the flow of liquid therethrough, a lever pivotally mounted on said housing having a first arm extending into said housing and into operative engagement with said valve to move said valve toward passage-opening position upon pivoting of said lever in a first direction, said lever having a second arm extending to the opposite side of the pivot axis from said first arm, means for removably suspending a liquid receptacle on said second arm below the outlet of said flow passage, the suspension of a receptacle on said means being effective to pivot said lever in said first direction and open said passage permitting liquid flow to said receptacle, a first spring connected between said second arm and said housing and arranged to resist pivoting of said lever in said first direction due to the suspension of said receptacle on said second arm, and a second spring connected between said housing and said second lever and arranged to yieldingly resist the turning moment on said lever due to the depositing of liquid in said receptacle.

11. A liquid flow control valve comprising, a valve housing having inlet and outlet openings with a liquid flow passage connecting said openings, a valve associated with said passage for opening and closing the passage to control the flow of liquid therethrough, a lever pivotally mounted on said housing and having an arm extending into said housing into operative engagement with said valve, said lever and said valve being so arranged that pivoting of said lever in one direction moves said valve successively from closed to open to closed positions relative to said passage, a ledge projecting from said housing and overhanging said lever, a relatively light tension spring disposed between said ledge and said lever and arranged to exert a force on said lever tending to pivot said lever in a direction contra to said one direction for resisting the movement of said valve to open position, and a relatively stiff tension spring disposed between said lever and said ledge and arranged to be stressed only after said valve has reached open position and to thereafter yieldingly resist further pivoting movement of said lever in said one direction as said valve is moved toward closed position.

12. A liquid flow valve comprising a valve housing having an inlet and an outlet opening with a liquid flow passage connecting said openings, a valve associated with said passage for opening and closing the passage to control the flow of liquid therethrough, a lever pivotally mounted on said housing having a first arm extending into said housing into operative engagement with said valve and a second arm extending to the opposite side of the pivot axis from said first arm, said second arm having a plurality of apertures therein including one elongated aperture, said valve and said lever being so arranged that pivoting of said lever in one direction moves said valve successively from closed to open to closed positions relative to said passage, an apertured ledge projecting from said housing and overlying said lever, a first tension spring connected between said ledge and said lever and arranged to yieldingly resist the pivoting movement of said lever in said one direction as said valve is moved toward open position, a second tension spring having one end anchored in an aperture in said ledge and the other end disposed in the elongated aperture in said second lever arm to form a lost motion connection between the spring and the arm, the length of said elongated aperture being such that said second spring is tensioned only after said valve has reached open position to thereafter resist further pivoting movement of said lever in said one direction as said valve is moved toward closed position.

13. A liquid flow valve comprising a valve housing having an inlet and an outlet opening with a liquid flow passage connecting said openings, a valve associated with said passage for opening and closing the passage to control the flow of liquid theerthrough, a lever pivotally mounted on said housing having a first arm extending into said housing into operative engagement with said valve, and a second arm extending to the opposite side of the pivot axis from said first arm, said second arm having a plurality of apertures therein, said valve and said lever being so arranged that pivoting of said lever in one direction moves said valve successively from closed to open to closed positions relative to said passage, an apertured ledge projecting from said housing and overlying said lever, a rod extending vertically through an aperture in said ledge and having a threaded portion disposed above said ledge, a nut on said threaded portion, a compression spring disposed between said nut and the upper surface of said ledge, and a tension spring connected between the lower end of said rod and said lever, the initial free length of said compression spring being such that said spring is completely compressed during pivoting movement of said lever in said one direction as said valve is moved to open position, and said tension spring having an initial tension greater than the force required to compress said compression spring and being yieldable after said spring is fully compressed to resist further pivoting movement of said lever in said one direction as said valve is moved toward closed position.

14. A liquid flow valve comprising a valve housing having an inlet and an outlet opening with a liquid flow passage connecting said openings, a valve associated with said passage for opening and closing the passage to control the flow of liquid therethrough, a lever pivotally mounted on said housing having a first arm extending into said housing into operative engagement with said valve, and a second arm extending to the opposite side of the pivot axis from said first arm, said second arm having a plurality of apertures therein, said valve and said lever being so arranged that pivoting of said lever in one direction moves said valve successively from closed to open to closed positions relative to said passage, an apertured ledge projecting from said housing and overlying said lever, a compression spring disposed between said housing and said valve pressing said valve against said lever and resisting the pivoting of said lever in said one direction, and a tension spring disposed between said ledge and said pivoting lever, and having a lost-motion connection with said lever such that said tension spring is not stressed until the valve reaches open position.

15. A liquid flow valve comprising a valve housing having an inlet and an outlet opening with a liquid flow passage connecting said openings, a valve associated with said passage for opening and closing the passage to control the flow of liquid therethrough, a first lever pivotally mounted on said housing having a first arm extending into said housing into operative engagement with said valve, and a second arm extending to the opposite side of the pivot axis from said first arm, said first arm of said first lever and said valve being so arranged that pivoting movement of said lever in one direction moves said valve from closed position to open position and then to closed position, a second lever pivotally mounted on said housing spaced above said first lever and having an abutment surface movable into contact with said housing when said valve reaches open position, a tension spring connected between said first and second lever, a compression spring connected between said second lever and said housing resisting the movement of said abutment surface toward said housing said tension spring being sufficiently stiff to act as a rigid link to transmit the movement of said first lever to said second lever until said abutment surface contacts said housing, and being yieldable thereafter to resist further pivoting of said lever in said one direction.

16. A liquid flow control valve comprising a valve housing with an inlet and an outlet opening and a liquid flow passage connecting said openings, a valve associated with the passage to open and close the same to control flow of liquid therethrough, a lever pivotally mounted on said housing having a first arm extending into said housing in operative engagement with said valve and a second arm extending to the opposite side of the pivot axis of the lever from said first arm, said second arm having an elongated opening therein with bottom and top walls and extending longitudinally of said lever with a transversely extending slot at one end of the opening, a leaf spring disposed in said opening having one end secured therein and a free and extending across said transverse slot, a tension spring connected between said housnig and said lever and having a hooked end portion engaged in said lever opening under the free end of said leaf spring, said lever and said valve being so connected that pivoting movement of said lever in one direction moves said valve from closed to open position and then to closed position, said leaf spring being arranged to flex permitting the free end of the leaf spring to move from the bottom wall of said elongated opening to the top wall thereof, abutment of said leaf spring against said top wall being coincident with the opening of said valve, and further pivoting of said lever in said one direction being resisted by said tension spring.

17. A liquid flow control valve comprising a valve housing having an inlet and an outlet opening with a passage connecting said openings in flow communication, means defining a valve seat at each end of said passage, a first valve element disposed in said housing in the flow path of liquid entering said inlet opening and arranged to be moved by gravity and the pressure of incoming liquid into sealing engagement on the valve seat at the inlet side of said passage, a second valve element disposed below the valve seat at the outlet opening of said passage and arranged for movement into sealing engagement with said outlet valve seat, a rod secured to said second valve element and extending through said passage and having a length greater than the length of said passage, a lever pivotally mounted on said housing having a first arm extending into said housing and into supporting contact under said second valve element, said first arm being effective upon pivoting of said lever in one direction to raise said second valve element and move said rod into contact with said first valve element to unseat said first valve element, a second arm on said lever extending on the opposite side of the pivot axis from said first arm, a tension spring connected between said housing and said second lever arm and having a lost-motion connection with said second arm, said second valve element being weighted to resist pivoting of said lever when a force is applied thereto tending to pivot said lever in said one direction until said tension spring positively engages said lever, and the engagement of said tension spring with said lever coinciding with the opening of said valve.

18. In a liquid flow control valve having a housing, a flow passage in said housing, a valve seat at one end of said passage, a valve movable toward and away from said seat to control the flow of liquid through the passage, and an actuating lever operatively connected to said valve for moving said valve in a fixed direction from closed to open position when a receptacle is suspended from an end of the lever, the combination with said valve and said lever of a spring connected between said lever and said housing, said spring being so tensioned and being so disposed relative to the pivoting axis of said lever as to impart a pivoting moment to said lever that is equal and opposite to the pivoting moment caused by the positioning of the empty receptacle on the lever arm.

19. A liquid flow control valve comprising a valve housing having inlet and outlet openings with a liquid flow passage connecting said openings, a valve associated with said passage for opening and closing the same to control the flow of liquid therethrough, a lever pivotally mounted on said housing and having an arm extending into said housing into operative engagement with said valve, said lever arm and said valve being so arranged that pivoting of said lever in a first direction moves said valve successively from closed to open to closed positions relative to said passage, a compression spring operatively connected between said lever and said housing and arranged to yieldingly resist the pivoting movement of said lever in said first direction as said valve is moved toward open position, and a tension spring operatively connected between said lever and said housing and arranged to be stressed only after said valve has reached open position and to thereafter yieldingly resist further pivoting movement of said lever in said first direction as said valve is moved toward closed position.

References Cited in the file of this patent

UNITED STATES PATENTS

| | | |
|---|---|---|
| Re. 23,447 | Pruitt | Dec. 25, 1951 |
| 1,753,122 | Kielsmeier | Apr. 1, 1930 |
| 2,634,755 | Hobbs | Apr. 14, 1953 |